May 7, 1963

R. C. MACE ETAL 3,088,222

FREEZE DRYING SYSTEM

Filed July 1, 1959

INVENTORS
ROBERT C. MACE
BY FREDERICK J. MOORE
Davis, Hoxie, Faithfull & Hapgood
ATTORNEYS

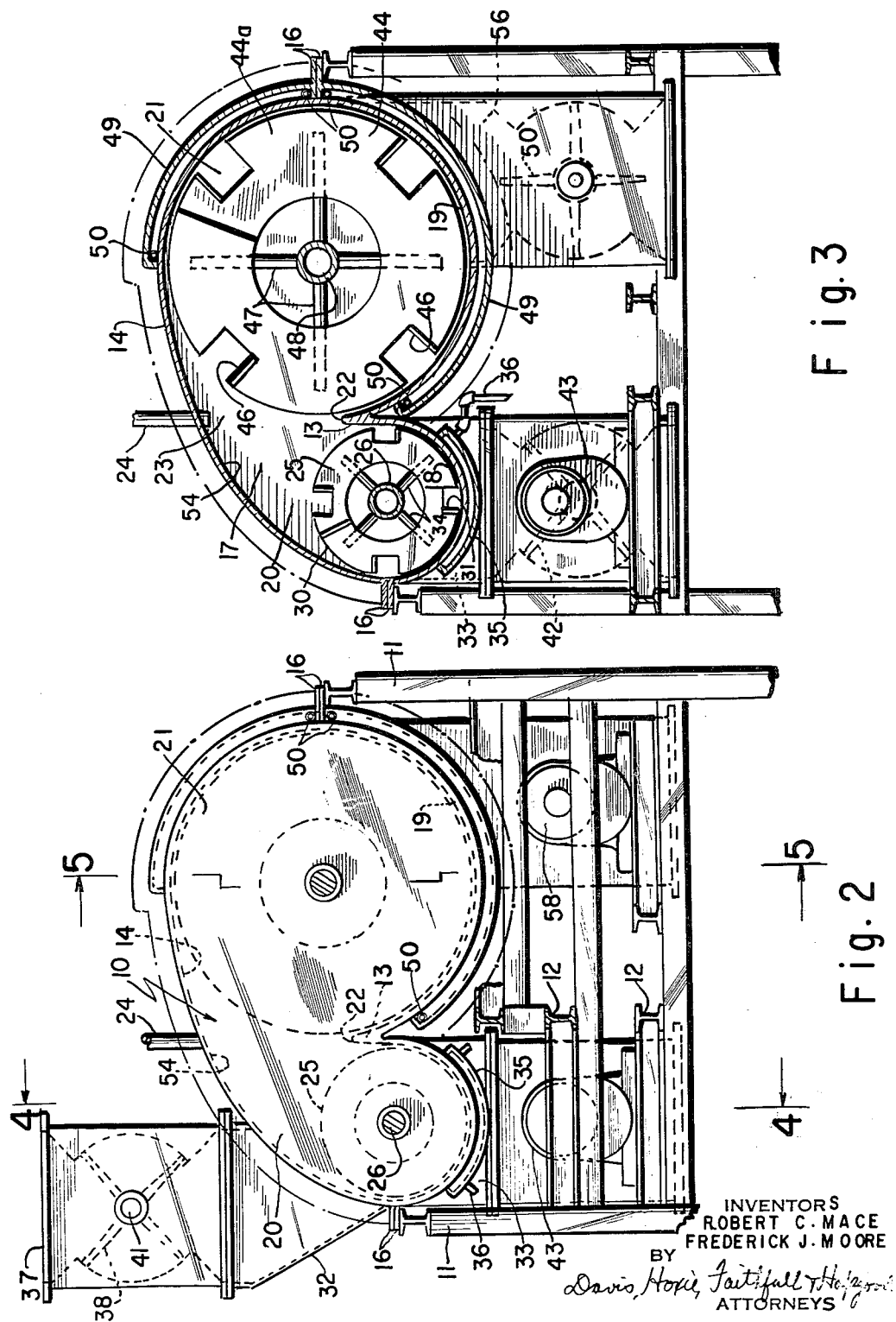

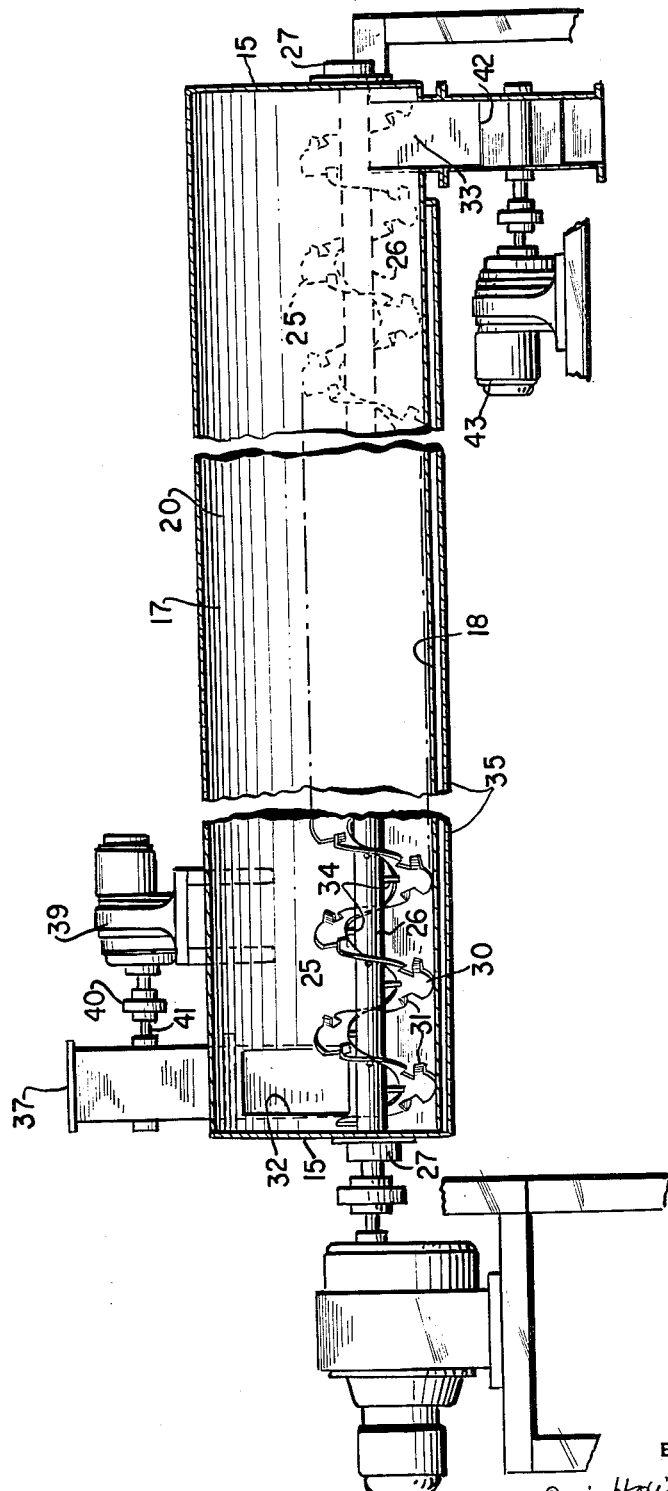

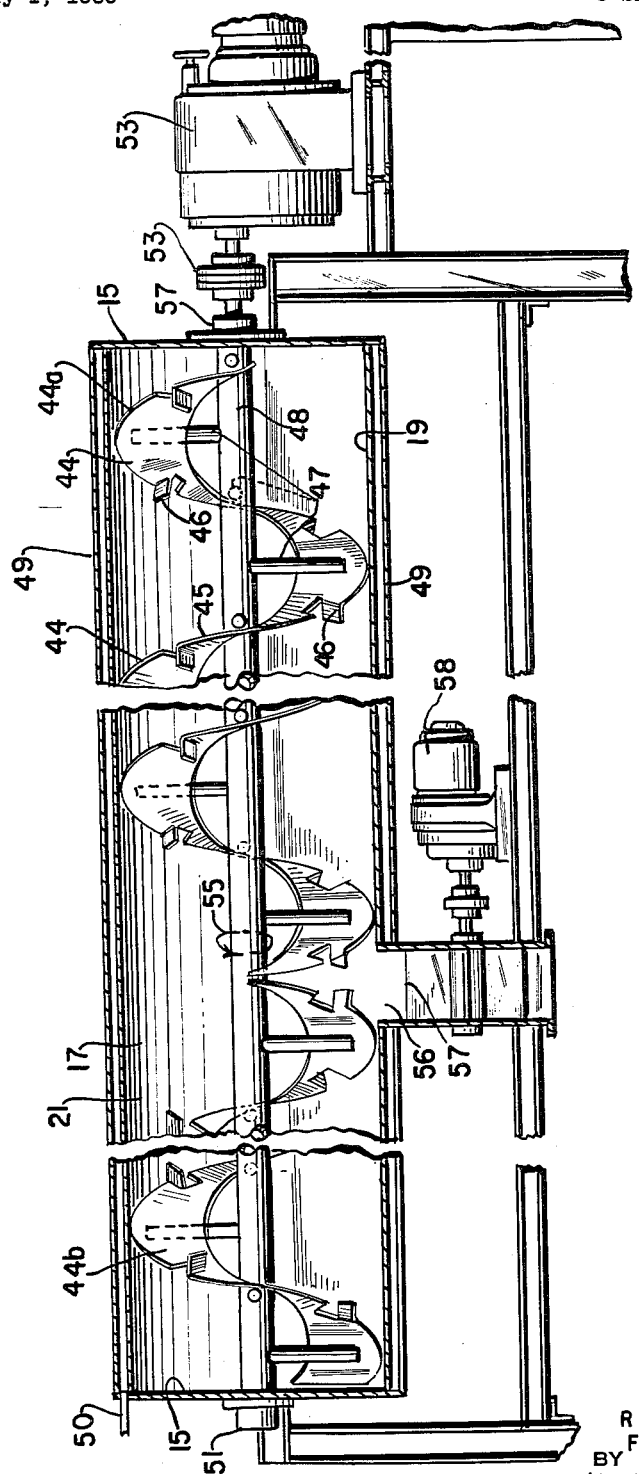

INVENTORS
ROBERT C. MACE
FREDERICK J. MOORE
BY Davis, Hoxie, Faithfull & Hapgood
ATTORNEYS //
United States Patent Office 3,088,222
Patented May 7, 1963

3,088,222
FREEZE DRYING SYSTEM
Robert C. Mace, Santa Monica, Calif., and Frederick J. Moore, Pasadena, Calif. (both % John H. Rice, 111 W. 7th St., Los Angeles 14, Calif.)
Filed July 1, 1959, Ser. No. 824,261
9 Claims. (Cl. 34—92)

This invention relates to apparatus for and method of freeze drying solid and semi-solid substances containing water or other aqueous liquids in a frozen state. More particularly, this invention pertains to the desiccation, or dehydration, of edible and other materials, particularly esculents of relatively large bulk for the preservation and storage thereof.

In our invention, frozen foodstuffs and other frozen materials of a particulate nature may be relatively quickly and effectively freed of frozen-state liquids such as water by sublimation drying without unfreezing such foodstuffs or other material being dried. Therein, the sublimation and removal of frozen liquid is substantially direct, immediate and efficient utilizing sublimation and precipitation zones to convert the frozen liquid into vapor and the vapor into frozen vapor substantially as and when it is formed. Moreover, in the new system a substantially uniform absolute pressure may prevail in those zones without hinderance to the movement of vapor from sublimation to precipitation stages and that absolute pressure may be relatively low vacuum less than the vapor pressure of the releasable frozen-state liquid being removed by such drying. Apparatus provided for in this invention has cooperating features thereof operable in a correlative manner so that the system may be continuous, intermittent, or of a batch character as desired with elements therein to move and handle the treated substances in a novel and highly useful way.

Other objects, features and advantages of this invention will be apparent from the following description and the accompanying drawings, which are illustrative only, in which FIGURE 1 is a view in side elevation of a single stage embodiment of this invention;

FIGURE 2 is a view in end elevation thereof taken along line II—II of FIGURE 1;

FIGURE 3 is a view in section taken along line III—III of FIGURE 1;

FIGURE 4 is a view in section taken along line IV—IV of FIGURE 2;

FIGURE 5 is a view in section taken along line V—V of FIGURE 2;

Figure 1:
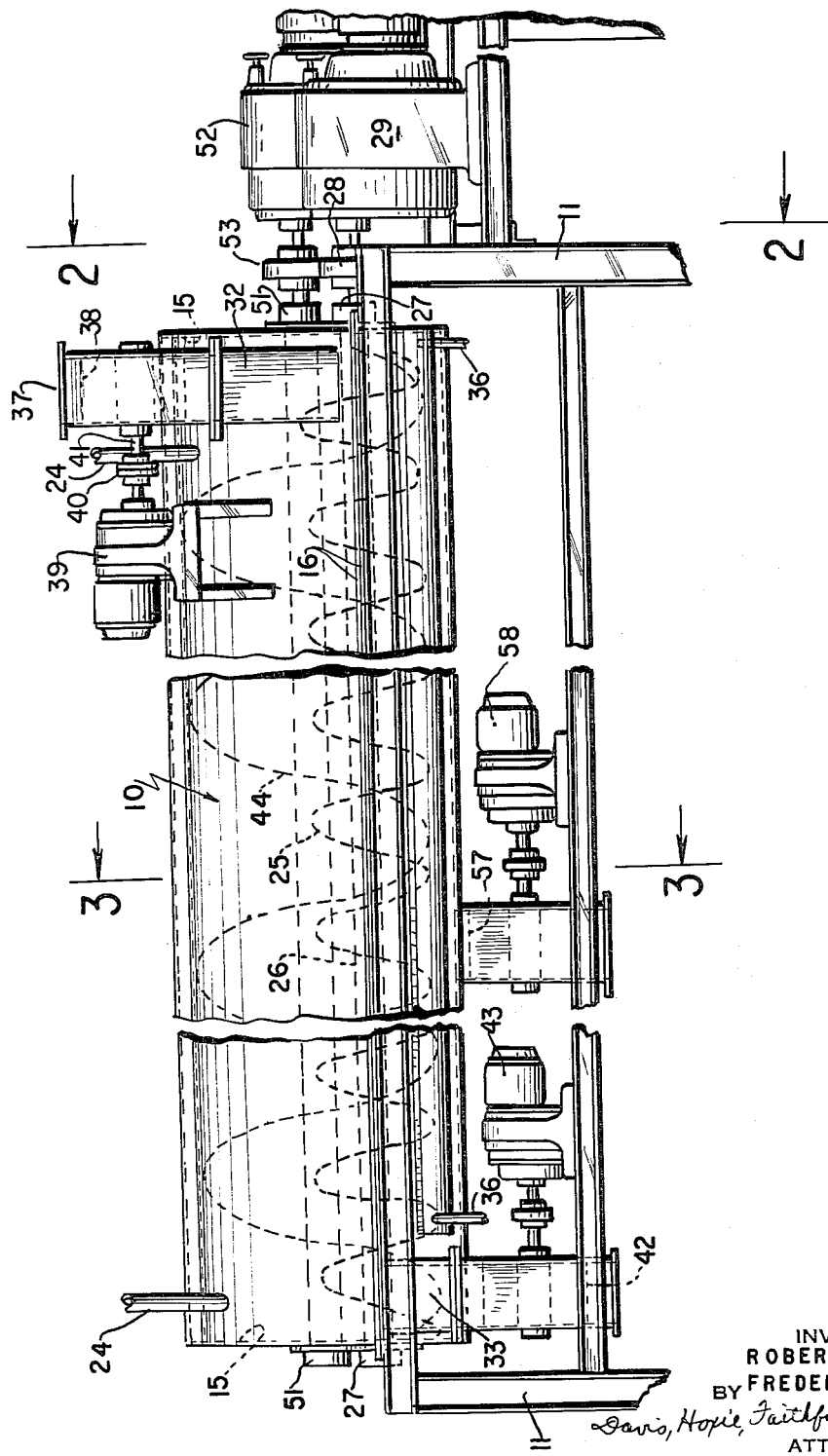

Referring to FIGURES 1 to 5 of the drawings, there is shown therein a single-stage vessel 10 comprising one embodiment of this invention, said vessel being supported on a structural frame 11 having auxiliary supports 12 for variable speed prime movers utilized therewith. Vessel 10 comprises a lobate lower half 13 and an arched upper half 14 with vertical end walls 15 in each half. Such halves are provided with respective flanges 16 which when brought together, utilizing a gasket or other sealing means, define a pressure-type enclosure surrounding an interior space 17.

Lower half 13 has a smaller trough 18 and a larger trough 19 therein in longitudinal extending side-by-side arrangement respectively defining the lower portions of a sublimation zone 20 and a precipitation zone 21. A virtually common wall 22 separates the two troughs at the bottom of an intermediate space 23 forming an unrestricted passage whereby the upper portions of the respective zones or chambers 20 and 21 are in full and open communication with each other between the end walls 15. The entire space 17 is maintained at a substantially uniform pressure, absolute, by means, for example, of a vacuum pump connected to space 17 through a pipe or suction line 24 shown as positioned adjacent the outlet end of the sublimation chamber where the sublimed vapor concentration would normally be lowest.

A helically bladed screw conveyor 25 is positioned in sublimation chamber 20 so as to fit trough 18. Conveyor 25 is provided with a longitudinally extending shaft 26 suitably supported in bearings 27 and one end of such shaft is connected by a flexible coupling 28 to a selectively variable speed power source 29 in the form of an electric motor speed reducer set by means of which the speed of rotation of conveyor 25 can be predetermined, e.g., in the light of the material being dried, the quantity of vapor to be sublimated therefrom and the capacity of the precipitation chamber 21 to handle such vapor. As shown, conveyor 25 has its helical blades in the form of a screw ribbon 30 portion of the periphery of which are cut and folded to provide peripheral paddles 31 extending axially so that as they are rotated in a clockwise direction as viewed in FIGURE 3, the particles of frozen material being disiccated will be tumbled as they are progressed along the length of chamber 20 from an inlet 32 to an outlet 33 therefrom. Spider arms 34 connect the blade 30 to shaft 26. As the blade 30 sweeps the inner surface of trough 18 it will pick up frozen material and tumble and expose all surfaces thereof to the drying action and at the same time inhibit prolonged engagement of any portion of such material with that trough surface. A heating jacket 35 is positioned against the wall of trough 18 for the circulation therethrough of a heating fluid at selected temperature, circulation pipes 36 being provided at opposite ends of the jacket. In that way, the loss of heat to sublime frozen-state liquid in the particles is made up while such particles remain frozen during the drying operation.

In operation, the particles themselves, which may be any of the edibles with frozen-state liquid such as water therein which is releasable because of porous skin or other characteristic of the edibles, are fed into an inlet hopper 37 in which a rotary vane valve 38 is rotated at a selected speed by an independent variable speed motor-reducer set 39, the output shaft of which is connected by a flexible coupling 40 to a shaft 41 which rotates the blades of valve 38. Hence, the rate of feed of frozen particles to be dried can be regulated at the inlet end of the sublimation chamber 20, the outlet side of valve 38 communicating with inlet 32. After the frozen particles have been moved the length of chamber 20, in the course of which they are constantly being tumbled by the conveyor and paddle action, they drop as dried frozen particles into the outlet 33, the lower end of which is connected to a casing for a rotary vane valve 42 operated by an independent variable speed motor-reducer set 43. The discharge side of valve 42 is provided with a flanged conduit for connection to a receiving vehicle, vessel, conveyor or other equipment to remove the dried frozen particles for storage, use, further handling or other disposition. Where relatively complete drying has been effective in chamber 20, the dried frozen particles will usually be in a state of preservation when kept dry even without refrigeration in numbers of cases. When such dried edibles are to be used, they may, for example, be put in water to restore them to a substantially fresh condition.

The interior surface of trough 19 on the precipitation side is kept relatively clear by the rotation of a helically ribbon bladed screw conveyor 44 which also is provided with a cut and fold screw flight 45 having longitudinally extending scraper paddles 46 thereon, the screw flight being maintained in position by spider arms 47 fixed to a conveyor shaft 48. Trough 19 and a part of the upper portion of precipitation chamber 21 is surrounded by refrigeration jackets 49 having circulation pipe connections 50 to the respective ends thereof for the circulation through such refrigeration jackets of a refrigerating fluid at a selected temperature sufficient to precipitate sublimed vapor as frozen-state vapor or ice in precipitation chamber 21.

The rotation of conveyor 44, the shaft of which is journaled in bearings 51 is provided for at correlative and selected speed by means of an independent variable speed motor reducer assembly 52 connected to the conveyor shaft by a flexible coupling 53. As conveyor 44 rotates in a counterclockwise direction as viewed in FIGURE 3, the blade and paddles will scrape the inner surface of the precipitation zone relatively clear and will toss ice fragments up into the space in zone 21 to serve as nuclei for augmented precipitation of sublimed vapor which moves through passage 23 substantially without hinderance from the sublimation chamber 20. Thus, the concave underside 54 of the arched wall 14 generally faces precipitation chamber 21 and appears to augment the movement of sublimed vapor from chamber 20 promptly and extensively, as formed, toward and into precipitation chamber 21, as though a sublimed vapor particle were a ray which upon striking surface 54 would be reflected toward chamber 21. Presumably, the surface 54 is extremely smooth and may even be coated with a substance such as "Teflon" for that purpose to facilitate the virtually immediate movement of sublimed vapor out of chamber 20 into precipitation chamber 21. Such movement is promoted by the freeze precipitation going on in chamber 21 to aid in drawing vapor into contact with the ice precipitation means in that chamber 21. Significant advantages appear in that there is relatively fast removal of sublimed vapor from sublimation chamber 20 and substantially immediate, efficient precipitation of the vapor in the precipitator 21 which promotes a shortening of time and expense and effectiveness of such freeze drying in vessels which, further, may be maintained at substantially the same negative pressure closer to the vapor pressure of the ice formed therein than heretofore considered practical.

In operation, the condenser portion of vessel 10 receives sublimed vapor for precipitation directly to the frozen state as ice substantially over the entire volume thereof as is apparent from FIGURES 1, 4 and 5. The screw conveyor 44 therein is provided with right-hand and left-hand flight portions 44A and 44B, respectively, which thereby act to sweep all ice therein in the course of the aforementioned counterclockwise rotation, shown by arrow 55 (FIGURE 5), to move all ice particles toward and out through ice outlet 56 intermediate the ends of chamber 21. It is in the course of such progression that ice particles are tossed into space in the precipitation zone to act as the aforementioned nuclei whereby the vapor precipitation surface and precipitation are augmented. Outlet 56 is provided with a rotary vane valve 57, which acts as a pressure seal, rotated at a suitable predetermined speed by an electric motor speed reducer set 58. The outlet 56 on the discharge side thereof is provided with a flange for connection to a receiving vehicle, vessel, or conveyor or other equipment to remove the ice for disposal, heat exchange or other treatment or purpose.

Figure 6:
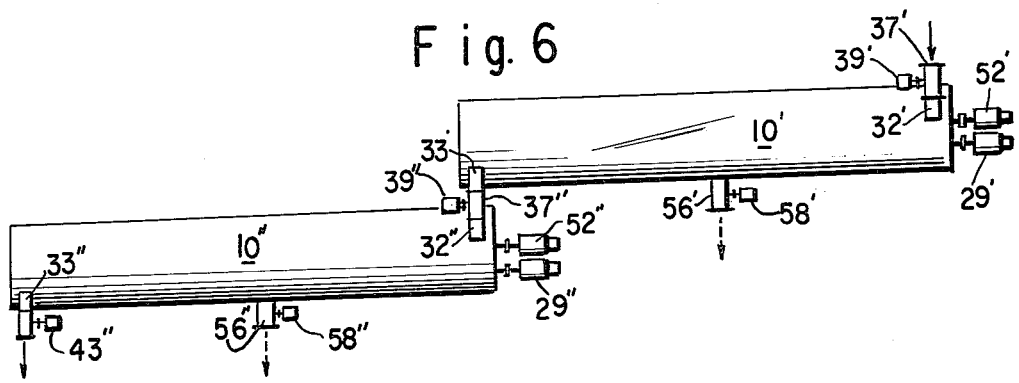
FIGURE 6 is a schematic view in side elevation of a two-stage embodiment of this invention in cascade arrangement.

The modification schematically shown in FIGURE 6 may be particularly appropriate in respect of the treatment of those substances to be desiccated to a relatively high extent. In such freeze drying, the sublimation of frozen-state liquid becomes more of a problem as the quantity of such frozen-state liquid becomes lowered. In that situation, it may be advantageous to utilize a pair of vessels employing this invention in cascade arrangement as shown in FIGURE 6 and parts therein corresponding generally in construction and functioning to parts in the embodiment of FIGURES 1 to 5, are provided respectively with the same reference numerals with the addition thereto of single and double accents. Thus, the desiccation or dehydration effected in vessel 10' may remove the bulk of the frozen-state liquid to be removed leaving to the lower vessel 10" the matter of removing the remaining frozen-state liquid to be removed under, for example, higher vacuum conditions in vessel 10" than in vessel 10'. Ice from the first stage drying would be discharged from outlet 56' while the ice from the second drying stage would be discharged from outlet 56". In the same way, particular dry solids or semi-solids from the sublimator of vessel 10' will pass through outlet 33' by gravity and through a pressure barrier vane valve in that outlet into inlet 32" for the sublimator of chamber 10", with the finally dried substances being discharged through the rotary vane valve in outlet 33". It will be apparent to those to whom this invention is disclosed that other and further arrangements and combinations of equipment and operations may be made within the scope of the disclosure herein.

Figure 7:
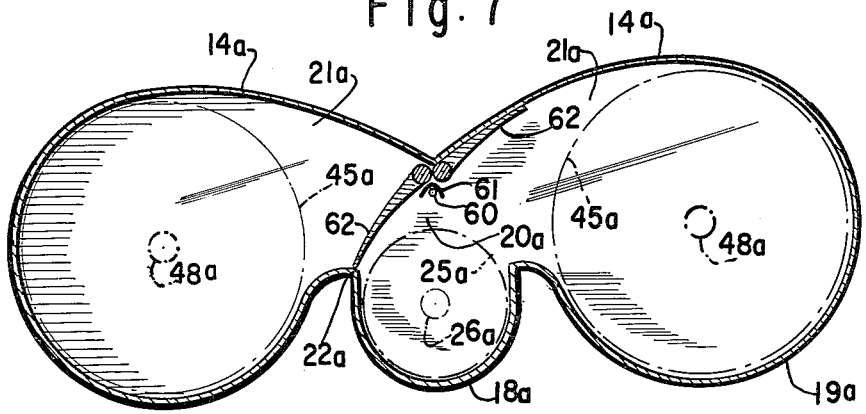
FIGURE 7 is a cross-section of a modified embodiment using alternate precipitators with a pivoted gate arrangement.
Figure 8:
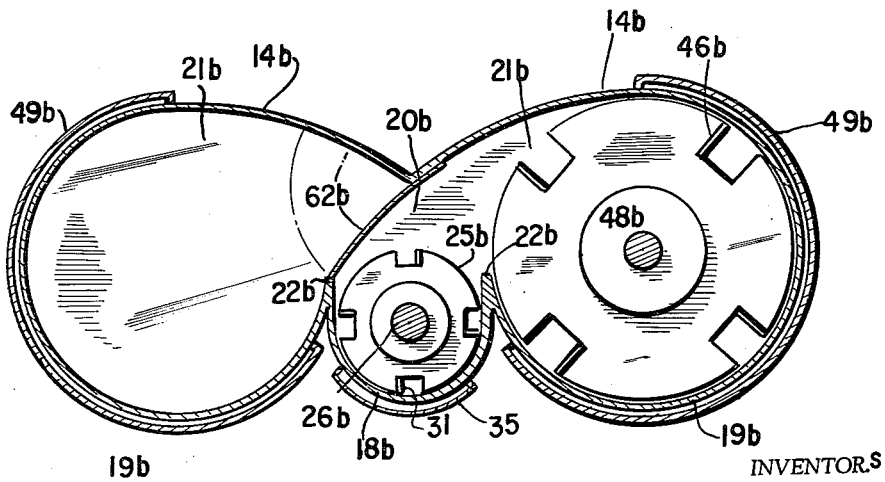
FIGURE 8 is a cross section of a further modified embodiment utilizing alternate precipitators with a sliding gate arrangement.

In the modification shown schematically in cross section in FIGURE 7, parts thereof corresponding generally in construction and functioning to the embodiment shown in FIGURES 1 to 5 are provided with the same reference numerals with the addition of a suffix letter $a$ thereto. In the FIGURE 7 device, the sublimator portion 20$a$ is, in operation, alternately in communication with right-hand and left-hand precipitators 21$a$. The heat make-up required for the sublimation of frozen-state liquid in zone 20$a$ may be provided by a longitudinally extending electrically resistance heater 60 over which a longitudinally extending parabolic reflector 61 is mounted to direct the heat substantially entirely into the particles in trough 18$a$. With the heating means 60 and 61, no heating jacket may be required for trough 18$a$. Where, for example, the vapor generation is so great as to warrant the use of alternate precipitators 21$a$, or precipitator is to be closed off from the sublimator for the purpose of maintenance or repair or removal of ice, pivotally mounted gates 62 may be provided and actuated manually, or automatically as desired, to close the selected passage to the precipitator 21$a$ which is not to be used for a time, while the other gate 62 is opened so that all sublimed vapor from the precipitator 20$a$ may promptly move into one or the other of the adjoining precipitators. The FIGURE 7 modification therefore is a further form which an embodiment of this invention may take for the achievement of the economies and benefits thereof. The FIGURE 8 modification operates in the same way as that shown in FIGURE 7 and is provided with the same reference numerals except that the suffix letter is $b$, the substantial difference being that trough 18$b$ is heated by a radiant heater 35$b$ and the gates 62$b$ are of a sliding rather than a pivotal nature.

Various other aspects and arrangements of the embodiments disclosed may be made, and other embodiments provided, without departing from the spirit of our invention or the scope of the appended claims.

It will be understood from the foregoing that the screw conveyor 25 and the corresponding trough 18 form a transport means for supporting an elongated mass of the material in sublimation chamber 20, such transport means being operable to move the elongated mass into and out of the vessel; the jacket 35 and its associated circulation pipes 36 form a means for heating the material transported by the transport means; the refrigerating jacket 49 and its associated circulation pipes 36 form a means for chilling the trough wall 19, which is a vapor-precipitating surface or area partly defining the precipitation chamber 21; and the rotary screw conveyor 44 with its scraper paddles 46 constitute a means for interposing ice particles between sublimation chamber 20 and wall 19 in position to form nuclei for intercepting and precipitating vapors passing toward chilled wall 19.

We claim:

1. Apparatus for freeze-drying material containing sublimable frozen-state liquid, the apparatus comprising a substantially closed vessel defining an elongated sublimation chamber and also defining an elongated precipitation chamber extending in generally parallel adjacent relation to the sublimation chamber means for agitating an elongated mass of said material in the sublimation chamber, the precipitation chamber opening into the adjacent sublimation chamber along substantially the entire length of said elongated mass to form an elongated vapor passage between the chambers, means for heating the material in said elongated mass, the vessel having a vapor-precipitating wall at least partly defining the precipitation chamber, means for chilling said wall, and a suction line leading from the interior of the vessel for maintaining in said chambers a partial vacuum sufficient to extract sublimation vapors from said frozen liquid, said vapors passing substantially directly and laterally into the precipitation chamber through said vapor passage from each point of said elongated mass and precipitating in part as ice on said wall.

2. Apparatus according to claim 1, comprising also means for interposing ice particles between the sublimation chamber and said chilled wall in position to form nuclei for intercepting and precipitating sublimation vapors passing toward said chilled wall.

3. Apparatus according to claim 1, in which the vessel has a wall partly defining said vapor passage and arched to reflect sublimation vapors from the sublimation chamber into the precipitation chamber.

4. Apparatus according to claim 1, in which said agitating means include a conveyor in the sublimation chamber.

5. Apparatus according to claim 1, in which said agitating means include a screw conveyor in the sublimation chamber for agitating the material while feeding it lengthwise through the sublimation chamber.

6. Apparatus according to claim 1, comprising also means for scraping ice particles from said wall and tossing the particles upwardly in the precipitation chamber.

7. Apparatus according to claim 1, in which the vessel has an ice outlet leading from the precipitation chamber, the apparatus comprising also rotary means in the precipitation chamber for scraping ice particles from said chilled wall and conveying the particles to the ice outlet while tossing them upwardly in the precipitation chamber.

8. In an apparatus for freeze-drying material containing sublimable frozen-state liquid, the combination of a vessel defining a sublimation chamber and a precipitation chamber, the vessel having an inlet for introducing material into the sublimation chamber and also having a vapor passage interconnecting said chambers, a suction line leading from the vessel for maintaining in said chambers a partial vacuum sufficient to extract sublimation vapors from material in the sublimation chamber, the precipitation chamber having a vapor-precipitating wall, means for chilling said wall to precipitate vapors from said vapor passage as ice on said wall, and means in the precipitation chamber for scraping and tossing upwardly ice particles from said wall to interpose ice particles as precipitation nuclei across said passage between the passage and wall, said vessel also having an ice outlet leading from the precipitation chamber, said scraping and tossing means including a rotary screw for conveying scraped ice particles to said ice outlet.

9. Apparatus for freeze-drying material containing sublimable frozen-state liquid, the apparatus comprising a substantially closed vessel defining an elongated sublimation chamber and also defining an elongated precipitation chamber extending in generally parallel adjacent relation to the sublimation chamber, transport means for supporting an elongated mass of said material in the sublimation chamber, said transport means being operable to move said elongated mass into and out of the vessel, the precipitation chamber opening into the adjacent sublimation chamber along substantially the entire length of said elongated mass to form an elongated vapor passage between the chambers, means for heating the material in said elongated mass, the vessel having a vapor-precipitating wall at least partly defining the precipitation chamber, means for chilling said wall, and a suction line leading from the interior of the vessel for maintaining in said chambers a partial vacuum sufficient to extract sublimation vapors from said frozen liquid, said vapors passing substantially directly and laterally into the precipitation chamber through said vapor passage from each point of said elongated mass and precipitating in part as ice on said wall.

References Cited in the file of this patent

UNITED STATES PATENTS

| | | |
|---|---|---|
| 2,406,682 | Hayes et al. | Aug. 27, 1946 |
| 2,853,796 | Sanders | Sept. 30, 1958 |